(12) United States Patent
Onuma

(10) Patent No.: US 8,804,134 B2
(45) Date of Patent: Aug. 12, 2014

(54) METHOD FOR INSPECTING CONDUCTOR CRIMPING PORTION OF CRIMPING TERMINAL

(75) Inventor: Masanori Onuma, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/583,272

(22) PCT Filed: Apr. 12, 2011

(86) PCT No.: PCT/JP2011/059095
§ 371 (c)(1),
(2), (4) Date: Sep. 7, 2012

(87) PCT Pub. No.: WO2011/129334
PCT Pub. Date: Oct. 20, 2011

(65) Prior Publication Data
US 2013/0044333 A1  Feb. 21, 2013

(30) Foreign Application Priority Data

Apr. 13, 2010 (JP) ................................ 2010-092135

(51) Int. Cl.
*G01B 11/14* (2006.01)
(52) U.S. Cl.
USPC .......................................... 356/614; 356/620
(58) Field of Classification Search
USPC .......... 356/614–640; 174/84 C, 36, 74 R, 82, 174/83, 84 R; 439/877–882, 421
See application file for complete search history.

(56) References Cited

U.S. PATENT DOCUMENTS

| 2008/0230269 A1 | 9/2008 | Susai et al. |
| 2009/0239411 A1 | 9/2009 | Susai et al. |
| 2011/0028054 A1* | 2/2011 | Tanaka et al. .................. 439/878 |

FOREIGN PATENT DOCUMENTS

| JP | 60-33761 A | 2/1985 |
| JP | 7-135031 A | 5/1995 |
| JP | 9-102346 A | 4/1997 |
| JP | 2004186037 A * | 7/2004 ............ H01R 43/01 |
| JP | 2007-173215 A | 7/2007 |
| JP | 2009-272141 A | 11/2009 |

OTHER PUBLICATIONS

International Search Report (PCT/ISA/210) dated Jun. 7, 2011, issued by the International Searching Authority in International Application No. PCT/JP2011/059095.
Written Opinion (PCT/ISA/237) dated Jun. 7, 2011, issued by the International Searching Authority in International Application No. PCT/JP2011/059095.
Communication, dated Mar. 25, 2014, issued by the Japanese Patent Office in counterpart Japanese Patent Application No. 2010-092135.

* cited by examiner

*Primary Examiner* — Tri T Ton
(74) *Attorney, Agent, or Firm* — Sughrue Mion, PLLC

(57) ABSTRACT

In a method for inspecting a conductor crimping portion of a crimping terminal, a laser displacement meter is disposed on a final stage of the terminal manufacturing line, and an upper surface of the flat-shaped bottom plate of the conductor crimping portion of a conveyed crimping terminal is measured, thereby acquiring, as an inspection result, data pertaining to at least one of items; namely, a width of the interior surface of a bottom plate, a width of the serrations, and a depth of the serrations.

2 Claims, 5 Drawing Sheets

METHOD FOR INSPECTING CONDUCTOR CRIMPING PORTION OF CRIMPING TERMINAL

TECHNICAL FIELD

The present invention relates to a method for inspecting a conductor crimping portion of an open barrel crimping terminal used in; for instance, an electric equipment system of an automobile.

BACKGROUND ART

FIG. 4(a) and FIG. 4(b) are a cross section diagram and a plan diagram of a conductor crimping portion 112 of a common crimping terminal, and FIG. 5 shows a cross section of the conductor crimping portion 112 swaged around a conductor W of an electric wire (see; for instance, Patent Document 1).

The conductor crimping portion 112 of the crimping terminal is usually formed from a bottom plate 121 and a pair of conductor swaging pieces 122, 122 so as to assume a substantially U-shaped cross section such that the bottom plate 121 becomes slightly curved. The pair of conductor swaging pieces 122, 122 extend upward from both side edges of the bottom plate 121 and are inwardly rolled so as to wrap the conductor W of an electric wire laid on an interior surface of the bottom plate 121 and swaged in such a way that tip ends of the respective conductor swaging pieces are engaged in the conductor W.

In many cases, contrivance is made to the crimping terminal of this type to enhance connectivity between a conductor and a terminal achieved when the crimping terminal is swaged to the conductor by forming indentations, or also called serrations 123 (see FIG. 5), in an interior surface of the conductor crimping portion 112 in the form of a trench or dot pattern (see; for instance, Patent Document 2).

Incidentally, it has already been known that, when the conductor crimping portion 112 is swaged to the conductor W of the electric wire, dimensional accuracy (a depth and a width) of the serrations 123 formed in the interior surface of the conductor crimping portion 112 greatly affect subsequent crimping performance. For this reason, under the present circumstances, an appropriate number of products created on a terminal manufacturing line is sampled and subjected to offline inspection by use of a measuring instrument, like a laser displacement meter.

RELATED ART DOCUMENTS

Patent Documents

Patent Document 1: JP-A-7-135031
Patent Document 2: JP-A-60-33761

DISCLOSURE OF THE INVENTION

Problem that the Invention is to Solve

When an attempt is made to inspect the related-art crimping terminal in a final product form (i.e., a conductor crimping portion that is not yet swaged to a conductor is pressed so as to assume a substantially U-shaped cross sectional profile), a curved surface is irradiated with a laser beam even when a position of serrations; for instance, is scanned by use of a laser displacement meter, because the bottom plate 121 of the conductor crimping portion 112 assumes a curved shape. For these reasons, there exists a problem of lesser-accurate data being obtained.

Since 100-percent inspection is difficult, an inspection result is not satisfactory from the viewpoint of its guarantee.

Another conceivable way is to inspect a dimension of serrations or a dimension of a circumference of the serrations when the crimping terminal still remains flat before the conductor crimping portion is bent so as to assume a substantially U-shaped cross sectional profile. However, since the inspection is not directed to a final product, there exists a problem of low reliability of the inspection. Specifically, although an inspection is carried out under the related-art inspection method, the inspection falls short of offering a strict guarantee.

The present invention aims, in view of the circumstances, at providing a method for inspecting a conductor crimping portion of a crimping terminal that enables easy, high-accuracy, inline ascertainment of all crimping terminals in a crimping terminal manufacturing line with regard to a dimension of serrations and a dimension of an area where serrations are provided and that can provide a strict guarantee to all of the inspected crimping terminals.

Means for Solving the Problem

In order to solve the problem, a first invention provides a method for inspecting a conductor crimping portion of a crimping terminal, wherein the crimping terminal has the conductor crimping portion to be connected to a conductor of an electric wire by means of crimping;

the conductor crimping portion is formed so as to assume a substantially U-shaped cross sectional profile from
   a bottom plate on an interior surface of which the conductor is to be laid and
   a pair of conductor swaging pieces that extends from both sides of the bottom plate, that is inwardly rolled so as to wrap the conductor laid on the interior surface of the bottom plate, and that is swaged in such a way that tip ends of the respective conductor swaging pieces are engaged in the conductor; and serrations are formed in an interior surface of the conductor crimping portion in order to enhance connectivity between the conductor and the terminal,
   the method being characterized by including
   manufacturing, on a terminal manufacturing line, the crimping terminal by forming the bottom plate of the conductor crimping portion into a flat plate of predetermined width, pressing the conductor crimping portion so as to assume a substantially C-shaped cross sectional profile, and forming the serrations within an interior surface with of the flat-shaped bottom plate;
   placing a non-contact dimension measurement device on a final stage of the terminal manufacturing line;
   measuring an upper surface of the flat-shaped bottom plate of the conductor crimping portion of a conveyed crimping terminal by means of the non-contact dimension measurement device, whereby data pertaining to at least one of items; namely, a width of an interior surface of a bottom plate, a width of serrations, and a depth of serrations, are acquired as an inspection result.

A second invention is based on the method for inspecting a conductor crimping portion of a crimping terminal of the first invention and characterized in that a laser displacement meter which emits a laser beam onto from directly above so as to scan an upper surface of the bottom plate of the conductor crimping portion that is a target is used as the non-contact dimension measurement device to measure a dimension of the target.

Advantages of the Invention

According to the first invention, since the bottom plate of the conductor crimping portion is formed into a flat shape having a predetermined width, a stable position of the terminal can be achieved during inspection. Further, since the upper surface of the terminal can also be retained as a flat surface, an inspection error which will occur when the dimension of the crimping terminal is measured from directly above can be lessened. In addition, a non-contact dimension measurement device is placed on a final stage of the terminal manufacturing line. The dimension measurement device measures the upper surface of the bottom plate of the conductor crimping portion of a conveyed crimping terminal, thereby acquiring, as an inspection result, data pertaining to at least one of items; that is, the width of the interior surface of the bottom plate, the width of the serrations, and the depth of the serrations. Hence, online 100-percent inspection of crimping terminals becomes possible, so that the accuracy of all of the crimping terminals can be guaranteed. Thus, reliability of products can be enhanced. Moreover, in relation to the shape of the crimping terminal, even when the bottom plate of the conductor crimping portion is molded into a flat plate, the shape of the bottom plate can be addressed by means of making a change solely in a terminal bending die having a related-art shape. Therefore, a change can be inexpensively made to manufacture of crimping terminals by means of a small-scale change in metal mold.

According to the second invention, since the laser displacement meter is used as a non-contact dimension measurement device, the dimension measurement device can be easily implemented without incurring a significant cost increase and by addition of a simple facility, or the like.

BRIEF DESCRIPTION OF THE DRAWINGS

FIG. 1 They are structural diagrams of a conductor crimping portion of a crimping terminal to be inspected under an inspection method of an embodiment of the present invention, wherein FIG. 1(a) is a cross section diagram of the conductor crimping portion taken when viewed from the front and wherein

FIG. 4 They are structural diagrams of a conductor crimping portion of a related-art crimping terminal, wherein FIG. 4(a) is a cross section diagram of the conductor crimping portion taken when viewed from the front and wherein

EMBODIMENT FOR IMPLEMENTING THE INVENTION

An embodiment of the present invention is hereunder described by reference to the drawings.

Figure 1A:
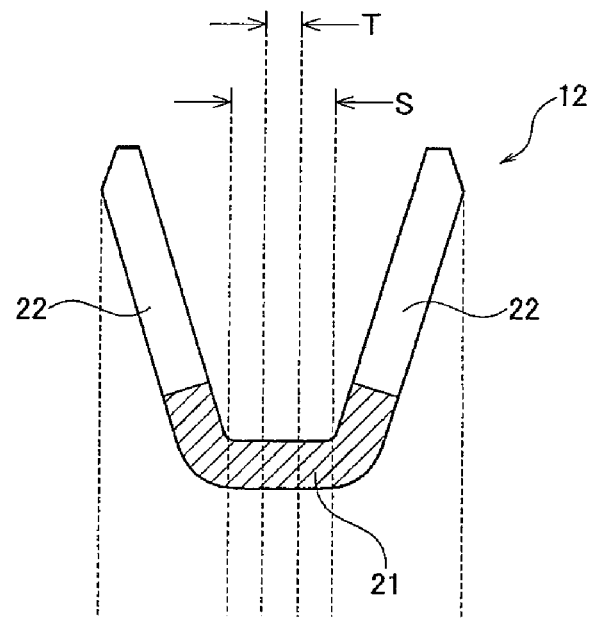
Figure 1B:
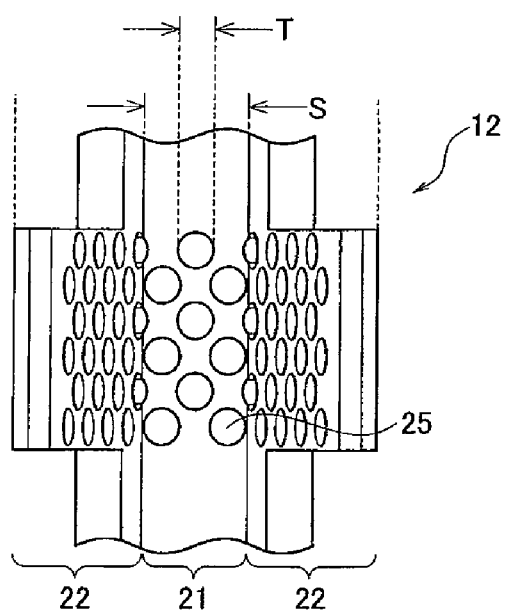
FIG. 1(b) is a plan diagram of the same.
Figure 2:
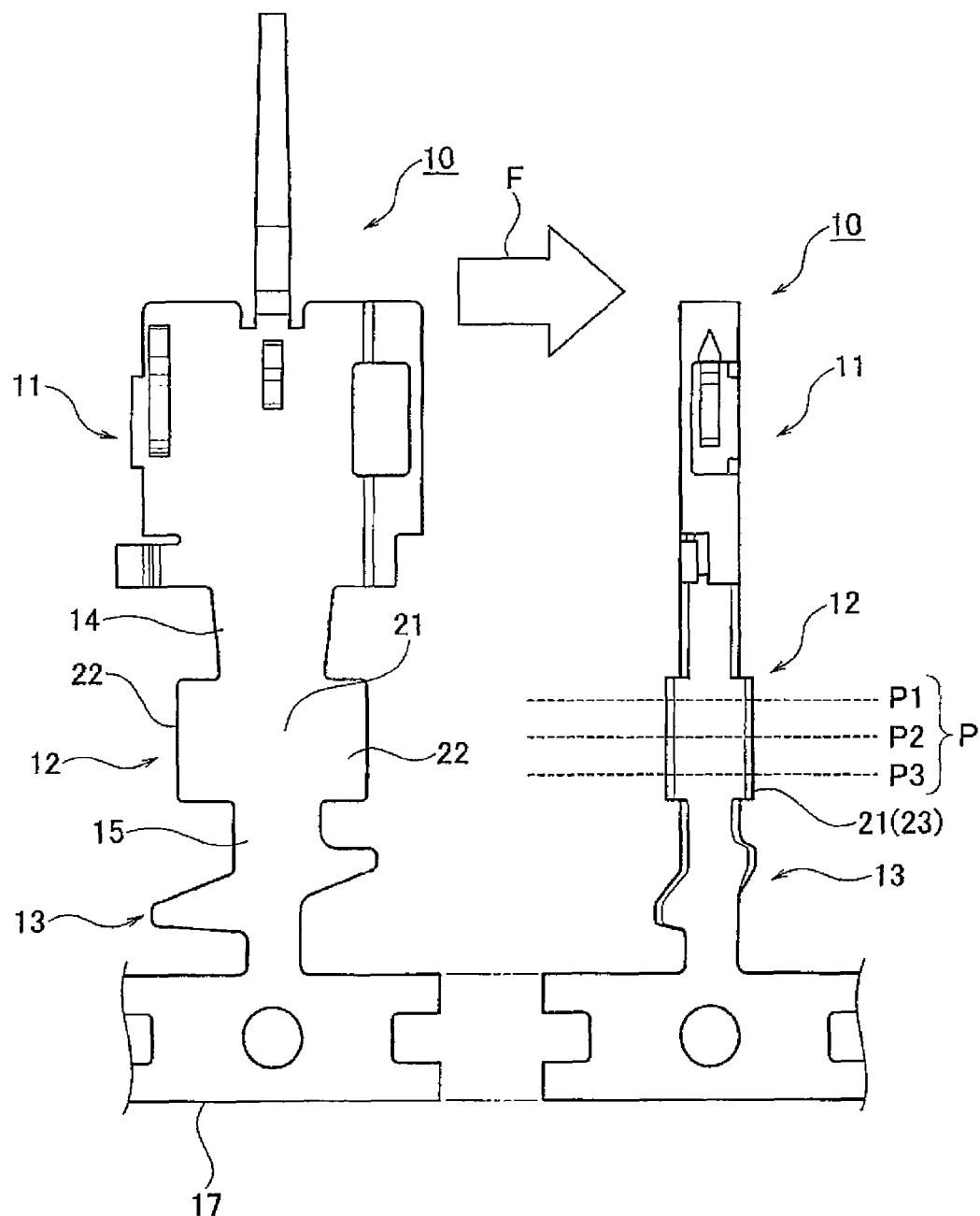
FIG. 2 It is a plan diagram achieved when a state of implementation of the inspection method of the embodiment of the present invention is viewed from above.
Figure 3:
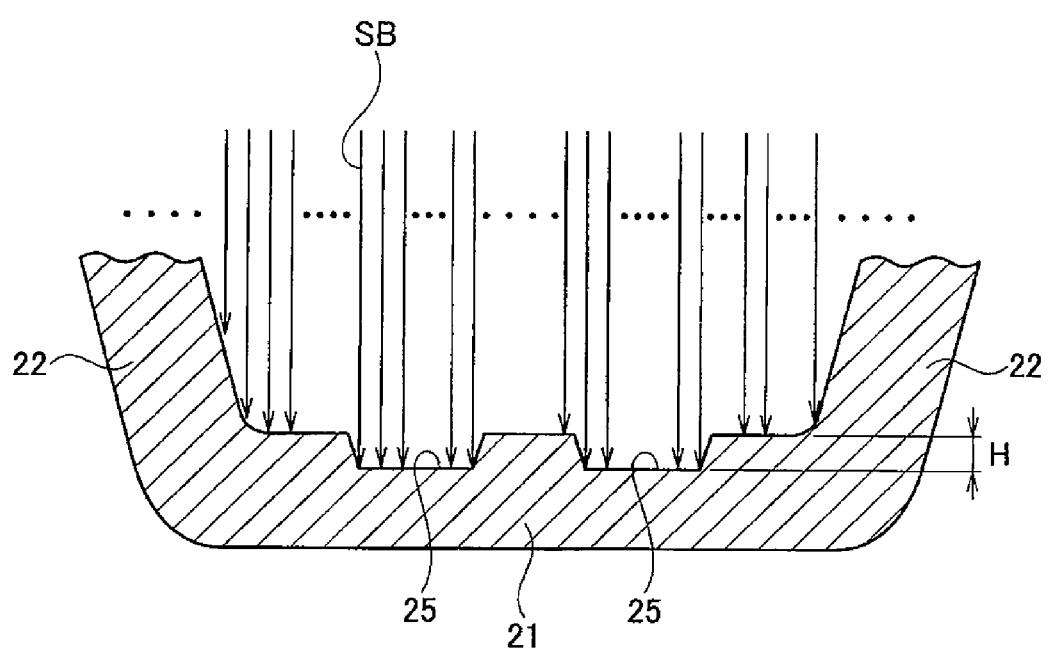
FIG. 3 It is an explanatory view of details of the inspection method of the embodiment of the present invention.
Figure 4A:
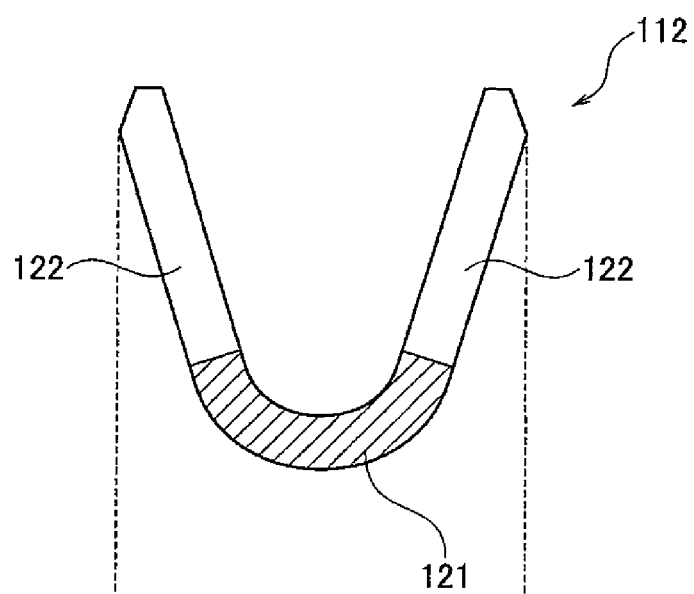
Figure 4B:
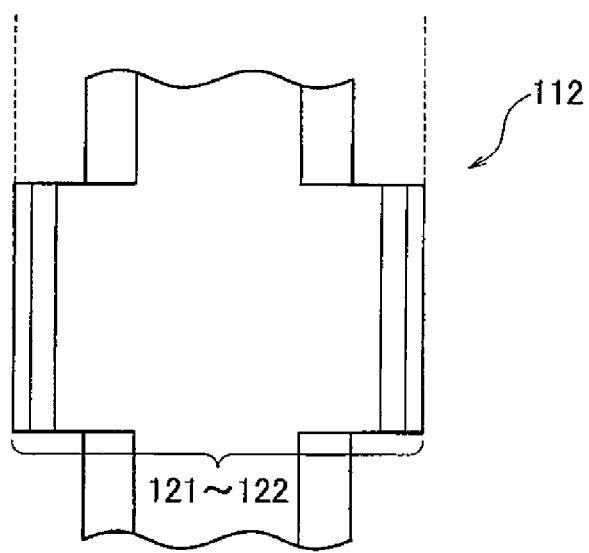
FIG. 4(b) is a plan diagram of the same.

FIGS. 1(a) and 1(b) are structural diagrams of a conductor crimping portion of a crimping terminal to be inspected under an inspection method of an embodiment of the present invention, wherein FIG. 1(a) is a cross section diagram of the conductor crimping portion taken when viewed from the front and wherein FIG. 1(b) is a plan diagram of the same. Further, FIG. 2 is a plan diagram achieved when a state of implementation of the inspection method of the embodiment of the present invention is viewed from above, and FIG. 3 is an explanatory view of details of the inspection method of the embodiment of the present invention.

Figure 5:
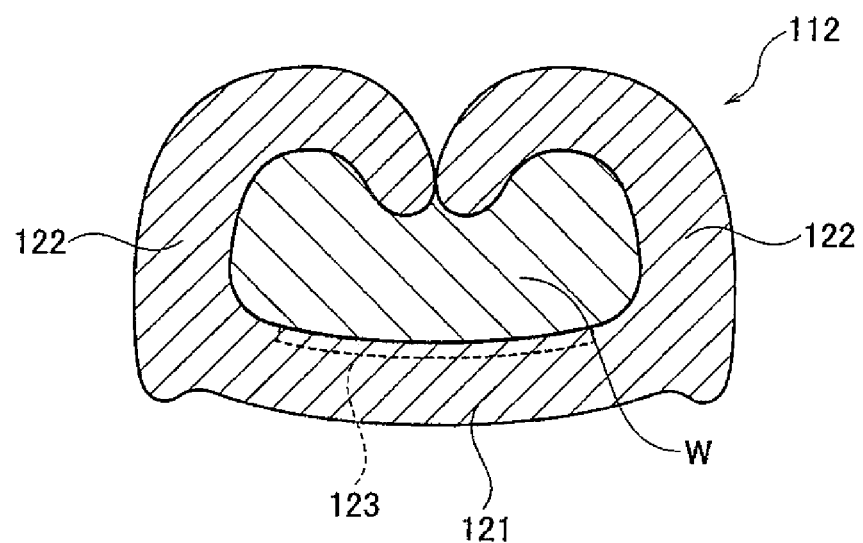
FIG. 5 It is a cross sectional diagram showing a state of the related-art crimping terminal achieved after the conductor crimping portion of the crimping terminal has been swaged to a conductor.

First, as shown in FIG. 1(a) and FIG. 1(b), a crimping terminal 10 to be inspected has a conductor crimping portion 12 to be connected to a conductor (see FIG. 5) of an electric wire by means of crimping. The conductor crimping portion 12 is formed so as to assume a substantially U-shaped cross sectional profile from: a bottom plate 21 on an interior surface of which the conductor is to be laid; and a pair of conductor swaging pieces 22, 22 that extends from both sides of the bottom plate 21, that is inwardly rolled so as to wrap the conductor laid on the interior surface of the bottom plate 21, and that is swaged in such a way that tip ends of the respective conductor swaging pieces 22, 22 are engaged in the conductor. In order to enhance connectivity between the conductor and the terminal, serrations 25 are formed in the interior surface of the conductor crimping portion 12.

The crimping terminal 10 is completed as a final product after being sequentially subjected to press working on a series of terminal manufacturing lines. In FIG. 2, partly finished pressed products sequentially move down from the left to the right of the drawing along a direction of arrow F. The left crimping terminal 10 is in a stage where the terminal is extended in a plane, and the right terminal is a finished product. The terminal of the finished product is inspected in a final stage and delivered as a product to the next swaging process.

The crimping terminals 10 are subjected to press working while concatenated, thereupon being formed in a single metal plate with single side edges thereof joined to a carrier 17. In an intermediate process before the crimping terminals 10 are finally produced, a single metal plate is press-cut, whereby the crimping terminals are formed in a shape of a flat extended terminal.

In a direction in which a connection electric wire extends (hereinafter called a "longitudinal direction," and another direction orthogonal to the longitudinal direction is called a "lateral direction"), an electric connection portion 11 to be connected to a counterpart terminal, or the like, is provided on a front end side of the crimping terminal 10. Further, the conductor crimping portion 12 to be swaged to an uncovered conductor at a leading end of the electric wire and a sheath swaging portion 13 to be swaged to a sheath of the electric wire are provided on a rear end side of the crimping terminal 10. The electric connection portion 11, the conductor crimping portion 12, and the sheath swaging portion 13 are continually formed as one having a common bottom plate. An area designated by reference numeral 14 in FIG. 2 is a junction between the electric connection portion 11 and the conductor crimping portion 12, and an area designated by reference numeral 15 designates a junction between the conductor crimping portion 12 and the sheath swaging portion 13.

As shown in FIG. 1(a) and FIG. 1(b), particularly a press terminal is manufactured as follows on the terminal manufacturing line. Specifically, the bottom plate 21 of the conductor crimping portion 12 is formed into a flat shape having a predetermined width, and the conductor crimping portion 12 is processed so as to assume a substantially C-shaped cross sectional profile by press-working. The plurality of circularly indented serrations 25 are arranged within a width S of the interior surface of the flat-shaped bottom plate 21.

In the meantime, as shown in FIG. 2, a laser displacement meter P is disposed on a final stage of the terminal manufacturing line as a non-contact dimension measurement device. As shown in FIG. 3, the laser displacement meter P scans an upper surface of the flat-shaped bottom plate 21 of the conductor crimping portion 12 of the conveyed crimping terminal 10 by means of a laser beam SB. Thus, as shown in FIG. 1(a) and FIG. 1(b), data pertaining to at least one of three items; namely, the width S of the interior surface S of the bottom plate 21, a width T of each of the serrations 25, and a depth H of each of the serrations 25, are acquired as an inspection result.

As shown in FIG. 3, the laser displacement meter P used as a non-contact dimension measurement device emits the laser beam from directly above so as to scan the upper surface of the bottom plate 21 of the conductor crimping portion 12 that is a target, whereby the dimension of the target can be measured. As shown in FIG. 2, so long as a plurality of targets are arranged along the longitudinal direction of the terminal or a plurality of scan lines P1 to P3 are previously set, dimensions of the plurality of targets can be concurrently measured. A laser beam scan can be carried out by means of actuating the laser displacement meter P itself or by means of feeding the crimping terminal 10.

As above, under the inspection method, the bottom plate 21 of the conductor crimping portion 12 is formed into a flat shape having a predetermined width. Accordingly, the position of the terminal 10 can be stabilized during inspection, and the upper surface of the terminal 10 can also be retained as a flat surface. For these reasons, an inspection error which will occur when the dimension of the crimping terminal is measured from directly above can be lessened.

The laser displacement meter P working as a non-contact dimension measurement device is disposed on a final stage of the terminal manufacturing line. The laser displacement meter P measures the upper surface of the bottom plate 21 of the conductor crimping portion 12 of a conveyed crimping terminal 10, thereby acquiring, as an inspection result, data pertaining to at least one of items; that is, the width S of the interior surface of the bottom plate 21, the width T of the serrations 25, and the depth H of the serrations. Hence, online 100-percent inspection of crimping terminals becomes possible, so that the accuracy of all of the crimping terminals 10 can be guaranteed. Thus, reliability of products can be enhanced.

Moreover, in relation to the shape of the crimping terminal 10, even when the bottom plate 21 of the conductor crimping portion 12 is molded into a flat plate, the shape of the bottom plate can be addressed by means of making a change solely in a terminal bending die having a related-art shape. Therefore, a change can be inexpensively made to manufacture of crimping terminals by means of a small-scale change in metal mold. Further, as described in connection with the present embodiment, when the laser displacement meter P is used as a non-contact dimension measurement device, the dimension measurement device can be easily implemented without incurring a significant cost increase and by addition of a simple facility, or the like.

In the present embodiment, there has been described a case where the circular indented serrations 25 are scattered across the width of interior surface on the upper surface of the bottom plate 21. However, no particular limitations are imposed on the geometry of the serrations.

Although the present invention has been described in detail and by reference to the specific embodiment, it is obvious for those who are versed in the art that the present invention be susceptible to various alterations or modifications without departing the spirit and scope of the present invention.

The present invention is based on Japanese Patent Application (JP-2010-092135) filed on Apr. 13, 2010, specifics of which are incorporated herein by reference in its entirety.

INDUSTRIAL APPLICABILITY

According to the present invention, since the bottom plate of the conductor crimping portion is processed into a flat plate having a predetermined width, a stable position of a terminal can be achieved during inspection. Further, since the upper surface is also held as a flat surface, an inspection error which will arise when a dimension of the crimping terminal is measured from directly above can be lessened. A non-contact dimension measurement device is disposed on a final stage of the terminal manufacturing line, and the upper surface of the bottom plate of the conductor crimping portion of a conveyed crimping terminal is measured by means of the non-contact dimension measurement device to thereby acquire, as an inspection result, data pertaining to at least one of the width of an interior surface of a bottom plate, the width of the serrations, and the depth of the serrations. Hence, online 100-percent inspection becomes possible, so that the accuracy of all of the crimping terminals can be guaranteed. Thus, reliability of products can be enhanced. In relation to the shape of the crimping terminal, the bottom plate of the conductor crimping portion is molded into a flat shape, and the shape of the bottom plate can be addressed by means of making a change solely in a terminal bending die having a related-art shape. Therefore, a change can be inexpensively made to manufacture of crimping terminals by means of a small-scale change in metal mold.

DESCRIPTIONS OF THE REFERENCE NUMERALS AND SYMBOLS

10 CRIMPING TERMINAL
12 CONDUCTOR CRIMPING PORTION
21 BOTTOM PLATE
22 CONDUCTOR SWAGING PIECE
25 SERRATIONS
W CONDUCTOR
P LASER DISPLACEMENT METER (DIMENSION MEASUREMENT DEVICE)
SB LASER BEAM
S WIDTH OF INTERIOR SURFACE OF BOTTOM PLATE
T WIDTH OF SERRATION
H DEPTH OF SERRATION

The invention claimed is:

1. A method for inspecting a conductor crimping portion of a crimping terminal, in which the crimping terminal has the conductor crimping portion to be connected to a conductor of an electric wire by crimping, the conductor crimping portion includes a bottom plate on an interior surface thereof, a pair of conductor swaging pieces that extends from both sides of the bottom plate, and serrations formed in the interior surface of the conductor crimping portion in order to enhance connectivity between the conductor and the crimping terminal, the bottom plate is configured so that the conductor of the electric wire can be laid thereon, the pair of conductor swaging pieces is configured to be inwardly rolled so as to wrap the conductor laid on the interior surface of the bottom plate, and to be swaged in such a way that tip ends of the respective conductor swaging pieces engage in the conductor, the method comprising:

manufacturing, on a terminal manufacturing line, the crimping terminal by forming the bottom plate of the conductor crimping portion into a flat plate of predetermined width, pressing the conductor crimping portion so as to assume a substantially C-shaped cross sectional profile, and forming the serrations within the interior surface of the flat-shaped bottom plate;

placing a non-contact dimension measurement device on a final stage of the terminal manufacturing line;

measuring the interior surface of the flat-shaped bottom plate of the conductor crimping portion of a conveyed crimping terminal by the non-contact dimension measurement device, whereby data pertaining to at least one from among a width of the interior surface of the bottom plate, a width of serrations, and a depth of serrations, are acquired as an inspection result.

2. The method for inspecting a conductor crimping portion of a crimping terminal according to claim 1, wherein the non-contact dimension measurement device includes a laser displacement meter which emits a laser beam onto from directly above so as to scan the interior surface of the bottom plate of the conductor crimping portion that is a target to measure a dimension of the target.

* * * * *